Nov. 18, 1947.  L. GELBMAN  2,431,034
BRICK OR BLOCK MOLDING MACHINE
Filed July 6, 1945  5 Sheets-Sheet 3

INVENTOR.
LOUIS GELBMAN
BY
ATTORNEY.

Nov. 18, 1947.  L. GELBMAN  2,431,034
BRICK OR BLOCK MOLDING MACHINE
Filed July 6, 1945  5 Sheets-Sheet 5

Patented Nov. 18, 1947

2,431,034

UNITED STATES PATENT OFFICE 2,431,034

BRICK OR BLOCK MOLDING MACHINE

Louis Gelbman, Yonkers, N. Y.

Application July 6, 1945, Serial No. 603,462

12 Claims. (Cl. 25—41)

This invention relates to new and useful improvements in brick or block molding machines.

At the present time the most popular block machines on the market make use of vibration to pack the mass of material from which the blocks are made. This invention proposes to improve machines of this type, and furthermore proposes to adopt the vibrating principle to the manufacture of brick. There can be no question that vibrating machines are superior to the types of machines previously used, namely tamping machines, presses, and the like. However, the most objectionable feature of the vibrating machine resides in the fact that the vibration can not be totally confined to packing the mass from which the blocks are made, but necessarily travels through many parts of the machine, and often through every part of the machine and including the base, and sometimes to the foundation of the building itself in which the machine is housed.

One of the important features of the present invention resides in so reducing the degree of vibration that a large part of the objectionable vibrations are so reduced, that they are no longer objectionable. I propose to accomplish this feat by dividing the period of vibration into more than one part, preferably two parts and separating these parts to different points of the machine. I have found that this is possible, and in fact it may be advantageously applied, for the simple reason that the mass of material which is being packed by the vibrations is packed denser at points nearer to the source of vibrations. I have discovered that when I distribute the points of vibration, I am capable of first applying the vibration to the bottom of the mass, and then applying the vibration to the top of the mass, and in this way it is possible to obtain more uniform blocks or bricks in so far as density is concerned. Because the vibrations are applied at two different points, separated points, it is possible to use much weaker vibrators at each point and yet their combined results will be just as good, if not better than, one large vibrator applied at one point.

More specifically, I propose to characterize the new machine by the fact that it includes a vibration table spaced beneath the supply hopper for the mixture to be formed into bricks or blocks. A mold is movably mounted for moving from a position beneath said hopper and from on said vibration table to a second position, adjacent said hopper. This mold is provided with a cut-off plate for closing the bottom of the hopper, when it is in its second position. Pallet support means is associated with the mold in its second position for engaging a pallet against the bottom of the mold. A pressure head is used, for engaging into the top of the mold while in its second position. This pressure head is also used to strip the packed brick or block from the mold. It is also proposed to provide this pressure head with the vibration means which when actuated is capable of vibrating the top portions of the mixture in the mold.

It is pointed out that the vibration table is depended upon to vibrate the bottom portions of the mixture in the mold. It will now be readily seen and understood that vibrations are applied at two distinct points, to the mixture which is being molded into bricks or blocks. One of these points is situated directly beneath the supply hopper and at the bottom of the mold. These vibrations also facilitate filling of the mold with the mixture from the supply hopper. The second point of vibration is at the pressure head, when the pressure is being applied to the top portions of the mixture in the mold, immediately before the time that the bricks or blocks are stripped from the mold.

The invention also proposes to operate the brick or block machine with compressed air. This is particularly advantageous in plants where a large supply of compressed air is available and needed for other purposes. For example, a sintering plant for producing aggregate intended to be used in bricks or blocks, requires a large quantity of compressed air to carry out the sintering process. The compressed air is needed for the draft in the sintering process. Since the compressed air is available, it is economical to operate the brick and block machine with it.

This invention therefore proposes a brick and block machine constructed to operate on compressed air and of a construction which is exceptionally simple, durable and desirable.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure.

Figure 2:
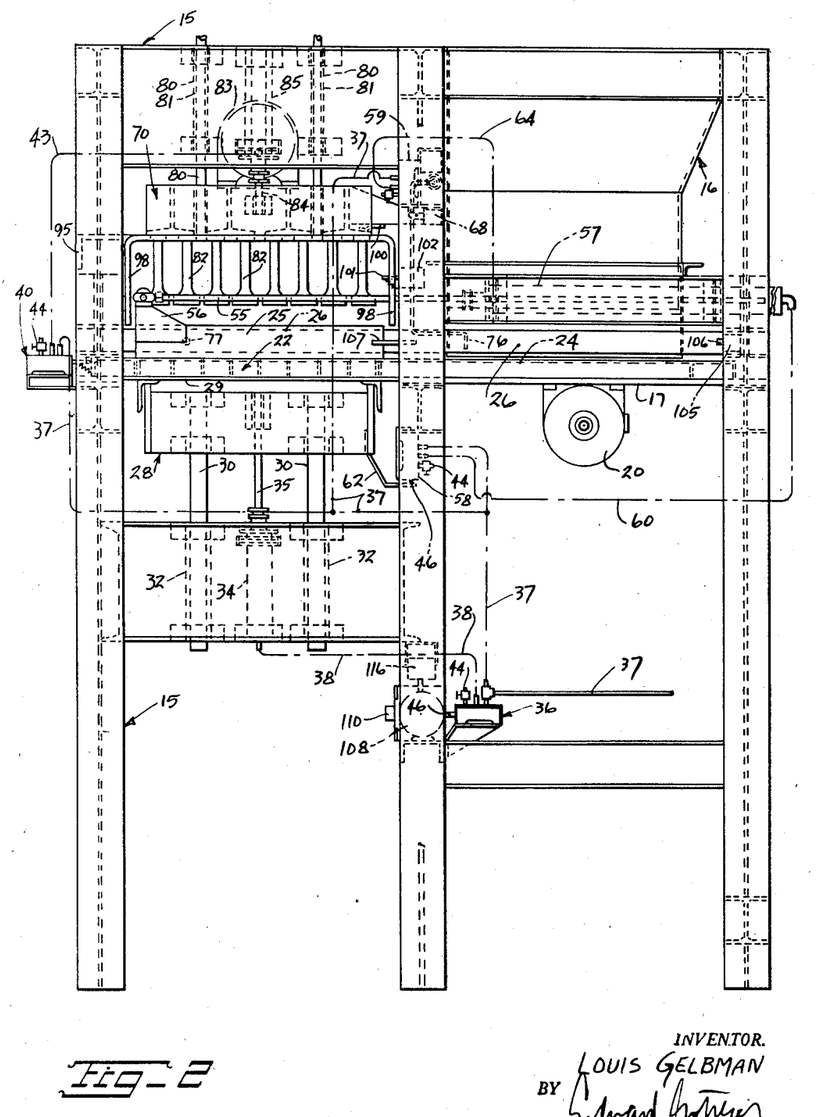
Fig. 2 is an elevation of Fig. 1.
Figure 3:
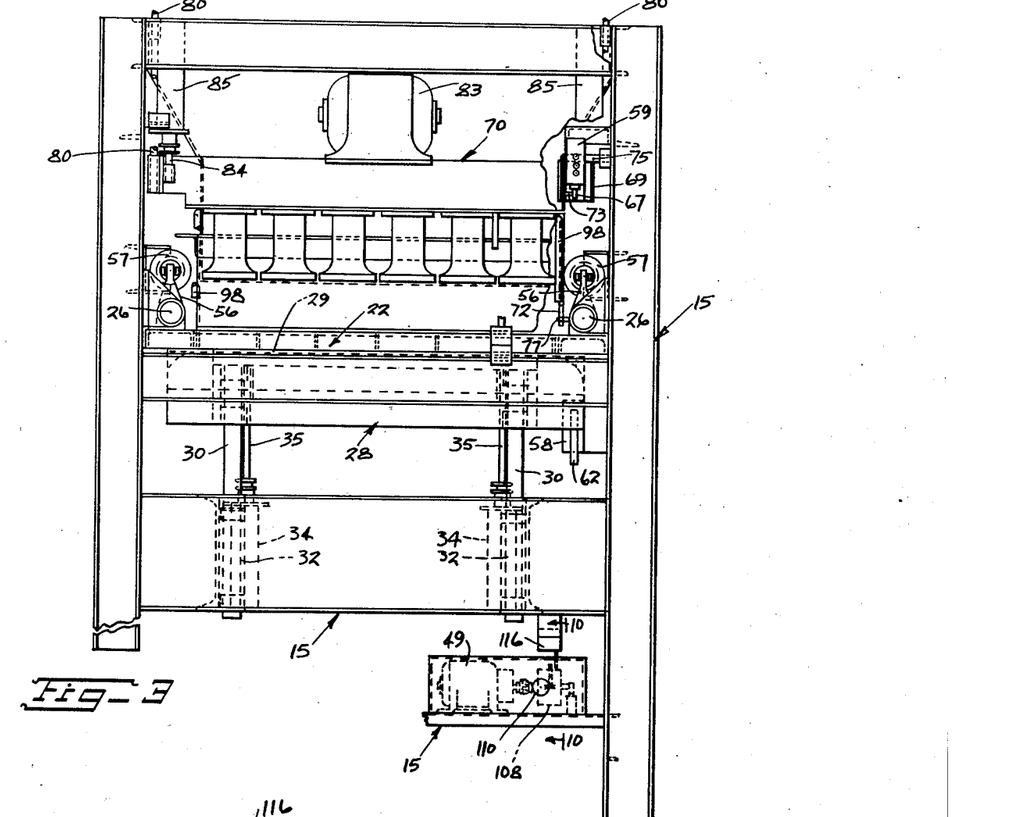
Fig. 3 is a fragmentary end view of Fig. 2 looking from the left hand end, and certain parts being broken away to disclose certain interior parts.

The new and improved brick or block machine in accordance with this invention includes a structural frame 15. A supply hopper 16 for the mixture to be formed into the bricks or blocks is supported across the top portion of one side of the frame 15. A vibrator table 17 is spaced a short distance beneath the bottom of the supply hopper 16 and is also supported on the frame 15. This vibrator table 17 is resiliently supported so that it is free to vibrate, so that the vibrations are more or less insulated from the frame 15. The resilient support of the vibrator table 17 is in the nature of sheets of resilient material 18 interposed between the vibrator table 17 and those parts of the frame 15 which support the table 17. An electric motor driven vibrator 20 is mounted upon the vibrator table 17 and produces the necessary vibrations for the vibrating table. A mold 22 is moveably mounted, horizontally on the frame 15 for moving from a position beneath the hopper 16 and from on the vibrating table 17 to a second position adjacent said hopper 16. In Fig. 2 the mold 22 is illustrated in its second position.

The mold 22 is open at the top and at the bottom. It is provided with the usual partitions, or cores, for shaping the bricks or blocks. A cut-off plate 24 extends laterally from the mold 22 and engages across the bottom of the hopper 16 when the mold 22 moves to assume its second position. This cut-off plate 24 is for the purpose of holding the mixture in the hopper 16 while the mold 22 is moved from beneath said hopper. The mold 22 is slidably supported by tubular members 25 which are mounted upon the side portions of said mold. These tubular members 25 slidably engage upon the large diameter rods 26 which are mounted on the frame 15 and along the path of motion of the mold 22.

A pallet support member 28 is vertically slidably mounted upon the frame 15 at a point beneath the second position of the mold 22. When this pallet support member 28 is raised, it engages a pallet 29 against the bottom of the mold 22. When the pallet support member 28 is lowered it is capable of supporting the pallet 29 and the bricks or blocks which have been stripped from the mold 22, in a take-off position. The pallet 29 with the bricks or blocks may be manually removed from the machine, though this is not satisfactory. A mechanical take-off device is proposed for removing the pallets, and for supplying the machine with new pallets, as needed. The pallet support member 28 is slidably supported to move in the vertical by a group of vertical rods 30 which are fixedly connected with the pallet support member 28 and which slidably engage through vertical bearings 32 mounted upon the frame 15.

The pallet support member 28 is associated with cylinder and piston means by which it may be raised and lowered. This cylinder and piston means includes cylinders 34 fixedly mounted upon the frame 15, and provided with internal pistons which are connected with piston rods 35 which connect with the pallet support member 28. It is proposed that the cylinders 34 be supplied with compressed air, by which the pallet support member 28 may be raised and lowered. A control valve 36 controls the air to said cylinders 34. A compressed air supply line 37 connects with the valve 36 which controls the supply of compressed air to supply lines 38 connected with the bottoms of the cylinders 34. The valve 36 is also provided with a needle valve controlled relief 44 through which the supply lines 38 may be connected with the atmosphere.

Figures 4, 5, 6:
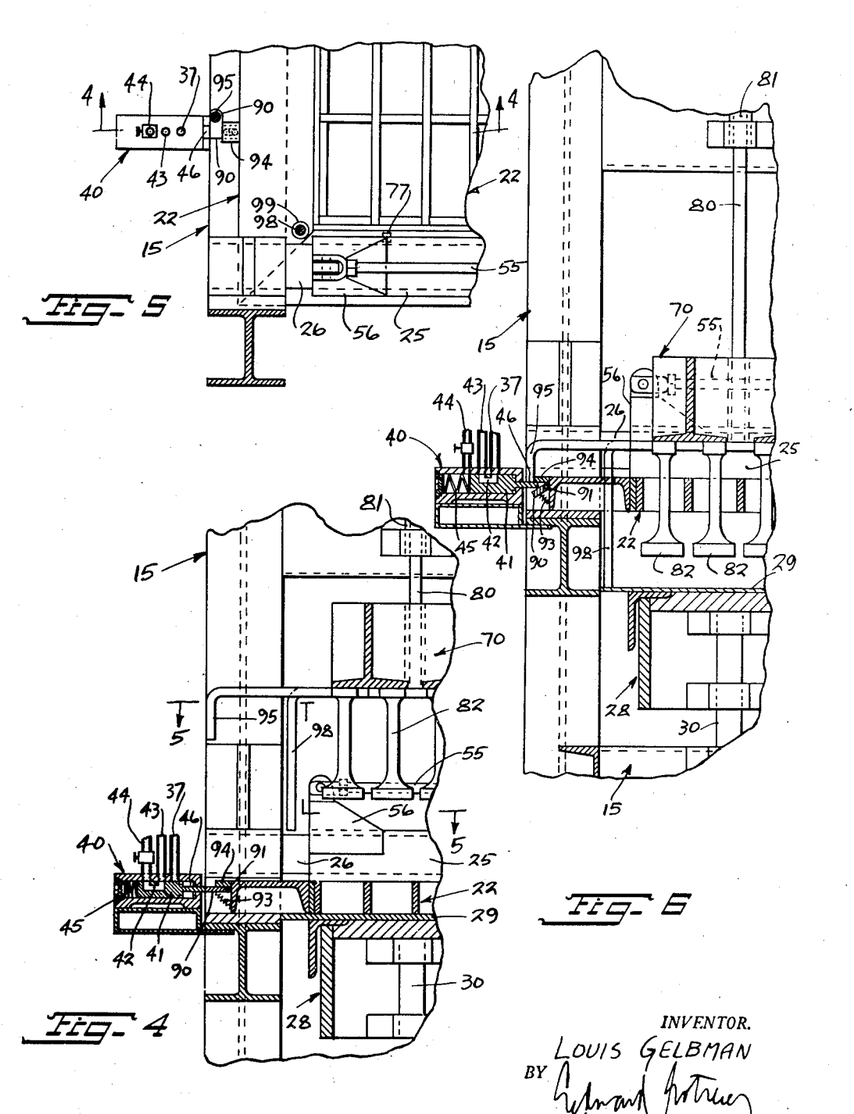
Fig. 4 is a fragmentary enlarged vertical sectional view of a part of the machine which is in the vicinity of the air valve shown projecting from the left end of Fig. 2, this sectional view being as though taken on the line 4—4 of Fig. 5.
Fig. 5 is a horizontal sectional view taken on the line 5—5 of Fig. 4.
Fig. 6 is a fragmentary enlarged vertical sectional view similar to Fig. 4 but illustrating the parts in a different position.

The construction of the valve 36 is substantially identical to a valve 40 shown in section in Fig. 4. It should be noted that the valve 40 has an internal sliding head 41 which is provided with a passage 42 which in one position of the valve is capable of connecting the compressed air supply line 37 with the supply lines 43 and in its second position, the one illustrated in Fig. 4, it connects the supply lines 43 with the needle valve controlled relief 44. The valve head 41 is urged into one of its positions by an internal expansion spring 45. The valve head 41 has a projecting plunger 46 which may be pressed inwards for moving the valve into its second position.

The valve 36 has a similar plunger 46. This latter plunger 46 is controlled by a rotary cam 48. The rotary cam 48 is mounted on a rotary control 108 connected with and operated by an electric motor 49 having a speed reduction unit. The cam 48 extends through about 160° about the control 108, see Fig. 10. When the cam 48 presses the plunger 46 inwards, the compressed air from the supply line 37 will be connected with the supply lines 38 so that it enters the bottoms of the cylinders 34 and drives the pistons upwards so that the piston rods 35 move the pallet support member 28 to its raised position. When the cam 48 releases the plunger 46, the valve 36 will connect the supply lines 38 with the needle valve controlled relief 44. Now the air will escape from the cylinders 34 and the pallet support member 28 will drop by gravity to its bottom position. The electric motor 49 is a synchronous motor so that it will operate at a constant speed.

The mold 22 is associated with cylinder and piston means by which it is moved from its first position to its second position and back again. This cylinder and piston means includes piston rods 55 connected with brackets 56 mounted upon the front ends of the tubular members 25. The piston rods 55 extend into horizontal cylinders 57 which are fixedly mounted upon the frame 15. The piston rods 55 connect with internal pistons within the cylinders 57. The cylinders 57 are controlled by two valves, indicated by numerals 58 and 59. The valve 58 controls the air to the back ends of the cylinders 57. The valve 59 controls the air to the front ends of the cylinders 57. The valves 58 and 59 are substantially identical in construction to the valve 40. The compressed air line 37 connects with the valve 58 which controls the supply of compressed air through the lines 60 which connect with the back ends of the cylinders 57.

The valve 58 is also capable of connecting the lines 60 with the needle controlled relief 44. The valve 58 has a plunger 46 which is controlled by an arm 62 mounted on the pallet support member 28. When the pallet support member 28 is in its raised position, said arm 62 presses the plunger 46 of the valve 58 inwards and connects the compressed air line 37 with the lines 60 and causes the pistons within the cylinders 57 to move forwards indirectly moving the mold 22 to its second position. During this operation the front ends of the cylinders 57 will be opened up to the atmosphere through the relief 44 of the valve 59 as will become clear as this specification proceeds. When the pallet support member 28 is lowered the plunger 46 of the valve 58 will move downwards and the valve 58 will connect the supply lines 60 with the relief 44 so that the back ends of the cylinders 57 are indirectly opened to atmosphere and the pistons within the cylinders are free to move back to their original positions.

Figure 7:
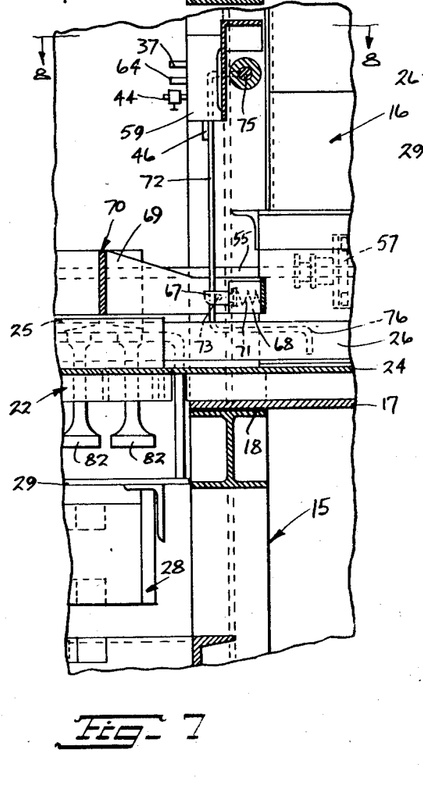
Fig. 7 is a fragmentary enlarged vertical sectional view taken directly behind that portion of the central vertical channel of Fig. 2 where the mold of the machine is located, this sectional view being as though taken on the line 7—7 of Fig. 8, but certain of the parts are not shown in section for clarity of illustration.
Figure 8:
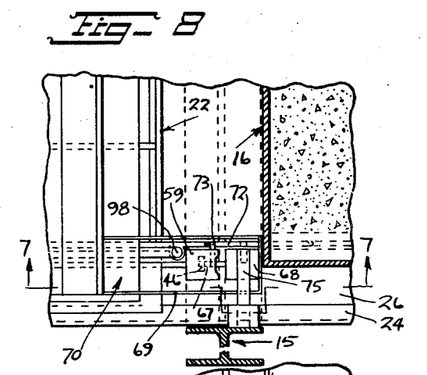
Fig. 8 is a horizontal sectional view taken on the line 8—8 of Fig. 7.
Figure 9:
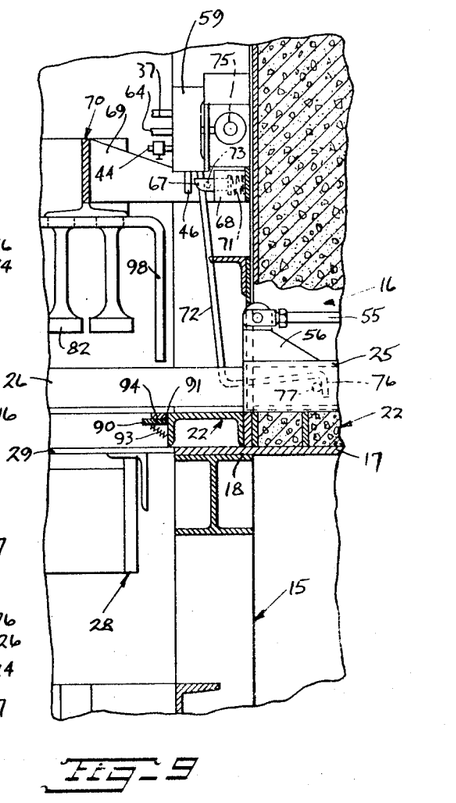
Fig. 9 is a sectional view similar to Fig. 7, but illustrating the parts in a different position, and furthermore illustrating certain of the parts not in section and showing other of the parts in section.

The compressed air supply line 37 connects with the valve 59. The valve 59 is provided with supply lines 64 which connect with the front ends of the cylinders 57. The valve 59 is also provided with a needle control relief 44. The valve 59 is capable of connecting the supply lines 64 with the relief 44. The valve 59 is provided with a control plunger 46 which is operated by a bolt 67. The bolt 67 is slidably mounted in a casing 68 which is mounted on a bracket 69 which in turn is mounted on a pressure head 70 for the machine. An expansion spring 71 is housed within the casing 68 and normally urges the bolt 67 into an extended position. When the bolt 67 is extended, it is in line with the plunger 46, as for example, illustrated in Fig. 7. When the bolt 67 is in its extended position and the pressure head 70 moved from its lowered position, as illustrated in Fig. 7 to its raised position as illustrated in Fig. 9, the bolt 67 will press upwards on the plunger 46 operating the valve 59 so that the compressed air will flow from the compressed air supply line 37 through the supply lines 64 and into the front end of the cylinders 57 indirectly causing the mold 22 to move back to its first position.

Figures 1, 11, 12:
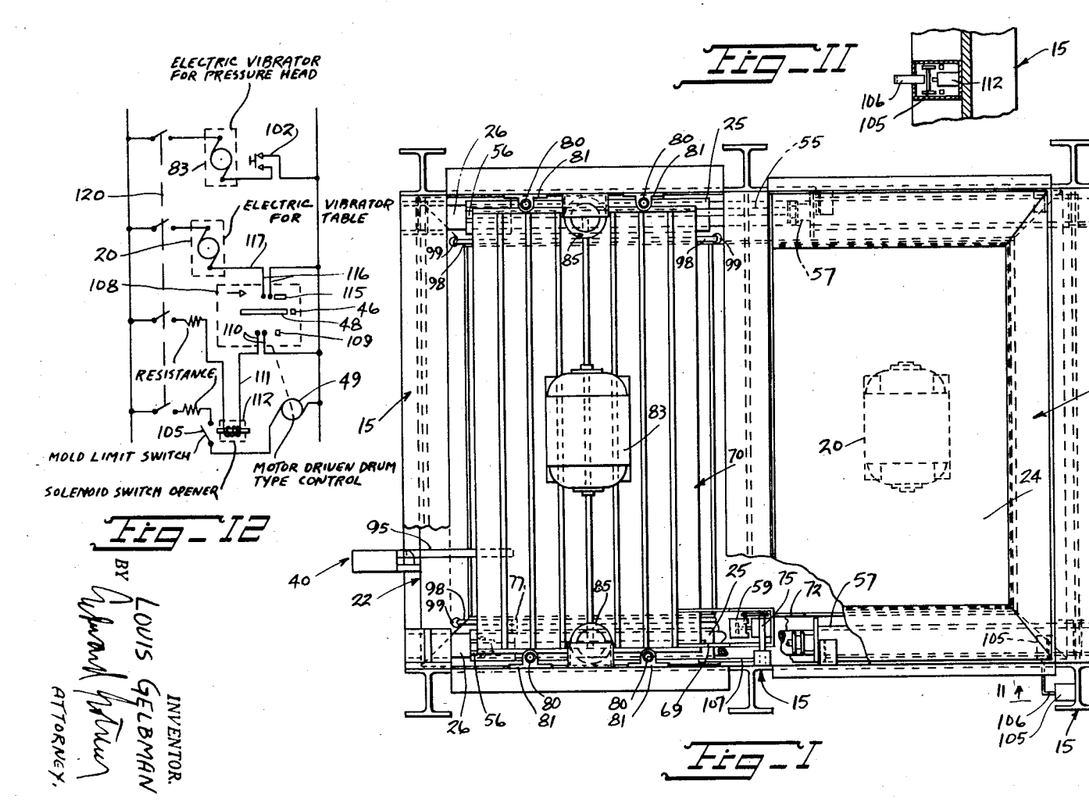
Fig. 1 is a plan view of a brick or block machine constructed in accordance with this invention, certain top parts being broken away to disclose under parts.
Fig. 11 is a fragmentary enlarged vertical sectional view taken on the line 11—11 of Fig. 1.
Fig. 12 is a schematic wiring diagram of the device.

A trip lever 72 is positioned adjacent the valve 59 and is capable of indirectly tripping the valve 59. By this statement I mean that the trip lever is adapted to engage against a pin 73 mounted on the bolt 67 for moving said bolt 67 inwards so that the plunger 46 is free. The trip lever 72 is pivotally supported at its top end upon a support rod 75 which is mounted on the frame 15, see Fig. 1. The bottom end 76 of the trip lever 72 is off-set rearwards and is engageable by a pin 77 mounted on and projecting from one of the tubular members 25. When the mold 22 reaches its first position the pin 77 will engage the end 76 of the trip lever 72 causing the trip lever 72 to move the bolt 67 inwards for freeing the stem 46 of the valve 59. This indirectly causes the valve 59 to connect the supply lines 64 with the relief 44 of the valve 59. Now the front ends of the cylinders 57 are opened up to atmosphere so that the pistons within these cylinders may move forwards to again move the mold 22 to its second position.

The pressure head 70 is vertically slidably mounted upon the frame 15. It is guided by a group of vertical rods 80. These vertical rods 80 are fixedly connected with the pressure head 70 and slidably engage through bearings 81 which are fixedly mounted on the frame 15. The pressure head 70 has bottom fingers 82 which are adapted to engage into and through the mold 22. The pressure head 70 is also provided with vibration means in the nature of an electric motor driven vibrator 83 which is mounted upon the top of the pressure head 70.

The pressure head 70 is associated with cylinder and piston means by which it may be raised and lowered. More specifically, piston rods 84 connect with the pressure head 70 and extend into vertical cylinders 85 which are mounted on the frame 15. The connecting rods 84 connect with internal pistons within the cylinders 85. The bottom ends of the cylinders 85 are connected with the air supply lines 43. As already stated these air supply lines 43 connect with the valve 40. The plunger 46 of the valve 40 is operated by a hinge bolt 90. This bolt 90 is supported by a hinge 91 on the mold 22. A spring 93 urges the bolt 90 upwards into a horizontal position against a stop 94. The bolt 90 may be tripped downwards by a finger 95 which is mounted on the pressure head 70.

When the mold 22 reaches its second position the bolt 90 will press the plunger 46 of the valve 40 inwards and will connect the air supply lines 43 with the relief 44. Now the bottom ends of the cylinders 85 are opened to the atmosphere and the pressure head 70 will move downwards due to gravity. It will move downwards until stop rods 98 which are mounted on the pressure head 70 come to rest upon the pallet 29. The mold 22 has small openings 99 through which the stop rods 98 pass to reach the pallet 29. At this moment the pallet 29 is in its raised position as illustrated in Fig. 6.

A very short period of time before the stop fingers 98 engage against the pallet 29, a finger 100 which is mounted on the pressure head 70 engages the control lever 101 of a switch 102 which controls the electric vibrator 83. Consequently the vibrator is set into operation while pressure head 70 is rested upon the mixture in the mold 22 so that the mixture in the mold is being vibrated while the pressure head rests on it. The pressure head will settle downwards during the vibration period compressing the material in the mold until the stop rods 98 rest upon the pallet 29. This controls the height of the bricks or blocks. Now the pallet support member 28 is ready to move downwards to its bottom position. When the pallet support member 28 reaches its bottom position the finger 95 will engage the bolt 90 and trip said bolt free from the plunger 46 of the valve 40. The valve 40 now operates to connect the compressed air supply line 37 with the supply lines 43 which direct the air to the bottom ends of the cylinders 85 indirectly moving the pressure head 70 upwards to its raised position.

The electric motor 49 is controlled by a mold limit switch 105. This limit switch 105 is mounted upon the frame 15. It is provided with a projecting plunger 106. A finger 107 is mounted on and projects from one of the tubular members 25, and when the mold 22 reaches its first position, said finger 107 engages the plunger 106 and closes the mold limit switch 105. This starts the electric motor 49 turning, which rotates said rotary control member 108 which carries the said control cam 48. The rotative control 108 is also provided with a cam 109 engageable with a switch 110 which controls a circuit 111, which controls a solenoid 112 having a plunger adapted to open the switch 105. When the switch 105 is opened, the motor 49 stops working. The control member 108 is also provided with another cam 115 which is cooperative with a switch 116 controlling an electric circuit 117 which controls the electric motor driven vibrator 20. A gang switch 120 controls the main current supplied to the machine.

Figure 10:
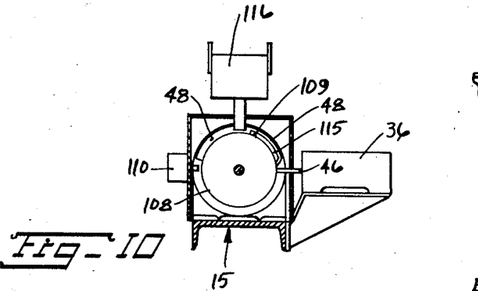
Fig. 10 is a fragmentary enlarged vertical sectional view taken on the line 10—10 of Fig. 3.

The operation of the new and improved brick or block machine is as follows:

Let us assume the machine to be in that stage of its operation where the mold 22 is positioned beneath the hopper 16 and the pallet support member 28 is in its lowered position. Let us also assume that the rotary control 108 is in a position in which the cam 115 is immediately before the switch 116. Let us assume that the rotary control 108 is turning clock-wise, as illustrated in Fig. 10, and that the compressed air to the line 37 is "on." The very first thing that now happens is that the cam 115 will close the switch 116 setting the vibrator table 17 into operation. For example, let us assume that this vibrator operates for six seconds and then the cam 115 releases the switch 116 which then opens and stops the vibrator table 17. During this vibration period, the mixture from the hopper 16 will fill the mold 22, and the mixture at the bottom of the mold immediately against the vibration table 17 will be denser than the mixture above it.

Next the cam 48 presses the plunger 46 of the valve 36 inwards. The valve 36 now connects the compressed air line 37 with the supply lines 38 so that compressed air enters the bottom ends of the cylinders 34 forcing the pallet support member 28 upwards so that the pallet 29 is moved to a level even with the bottom of the mold 22. When the pallet support member 28 reaches this position, the finger 62 will press inwards the plunger 46 of the valve 58 which then connects the compressed air to the back ends to the cylinders 57. The pistons within these cylinders now move the connecting rods 55 forwards which indirectly move the mold 22 forwards into its second position. During this forward motion of the mold 22, the valve 59 is in a position in which the air lines 64 are connected with relief 44 so that front ends of the cylinders 57 are not air bound.

When the mold 22 reaches its second postion, which is the position in which it is directly beneath the pressure head 70, the bolt 90, which is mounted upon the forward end of the mold 22, will engage and press inwards the plunger 46 of the valve 40. The valve 40 now connects the supply lines 43 with the relief 44 allowing the escape of air from the bottom ends of the cylinders 85. This causes the pressure head 70 to move downwards to a position in which the bottom fingers 82 of the pressure head engage into the top of the mold 22 so as to assist in compressing the material in the mold. At this instant, the finger 100 engages the control lever 101 of the electric switch 102 which sets the vibration 83 into operation. The vibrations assist in packing the material in the mold 22 and the pressure head 70 keeps sinking until the stop rods 98 come to rest on the pallet 29. Up to this point the vibrator 83 is still functioning. Now, the rotary control 108 has turned to a point at which the cam 48 rides off of the plunger 46 of the valve 36 releasing said plunger so that the spring within the valve 36 shifts the valve to cause it to connect the supply lines 38 with the relief 44. The air now starts escaping from the cylinders 34, causing the pallet support member 28 to move downwards.

Since the pressure head 70 is now being supported by the pallet 29 which rests on the pallet support member 28, the pressure head 70 will also move downwards until it reaches its lowermost position. In this latter position the finger 95 will strike and move the trip bolt 90 pivoting it downwards against the action of the spring 93 so that it assumes the position shown in Fig. 6. This releases the plunger 46 of the valve 40 and the valve head 41 moves so that the valve now connects the compressed air supply line 37 with the supply lines 43 which supply compressed air to the bottom ends of the cylinders 85. This causes the pressure head 70 to move upwards. Preferably, the finger 100 now idles past the switch 102 so as not to set the vibrator 83 into operation. At this point an automatic mechanism, not illustrated on the drawing, takes the pallet 29 with the molded brick or block, off of the pallet support member 28 and supplies a new pallet 29 to a position on the pallet support member 28.

When the pressure head 70 reaches its uppermost position, the bolt 67 which is carried by the casing 68 which in turn is supported by the bracket 69 mounted on said pressure head, engages the plunger 46 of valve 59 lifting the plunger and moving the valve so that the air supply line 37 now connects with the supply lines 64 which are connected to the front ends of the cylinders 57. It should be remembered that the back ends of the cylinders 57 are opened to atmosphere because the plunger 46 of the valve 58 is in a down position. It is in this latter position because the pallet support member 28 is now in its lowered position. The compressed air enters the front ends of the cylinders 57 driving from pistons backwards, and indirectly, through the connecting rods 55 etc., moves the mold 22 back to its first position beneath the supply hopper 16. At the moment when the mold 22 reaches its first position, the pin 77 which is carried on one of the tubular members 25 which is directly connected with the mold 22, strikes the end 76 of the trip lever 72, pivoting this trip lever and causing it to engage the pin 73 of the bolt 67 moving said bolt inwards and freeing the plunger 46 of the valve 59. The valve 59 now moves so that the air lines 64 are now connected with the relief 44. The pistons within the cylinders 57 are now ready to move forwards.

A very short period of time before the mold 22 reached its first position the rotary control 108 has turned to a position in which the cam 109 operates the switch 110 which closes the circuit to the solenoid 112 causing the solenoid to open the switch 105. Since the switch 105 controls the motor 49 of the rotary control 108, the rotary control now stops rotating. After the mold 22 reaches its complete first position, the finger 107 strikes the switch 105 closing said switch and restarting the motor 49 of the rotary control 108. The rotary control 108 now starts turning, and the cam 115 operates the switch 116 to start the vibrator 20 of the vibrator table 17. The complete cycle of operation now repeats.

It is advisable, but not necessary, to stop the brick or block machine in a position in which the mold 22 is a very short distance in front of its first position, at which point the finger 107 has not, as yet, closed the switch 105. The machine is stopped at this point by cutting the air supply through the line 37 at the right instant. If the air supply 37 is cut a fraction of a second later, the switch 105 will be closed, and the motor 49 will start up and will run continuously because the mold 22 is holding the switch 105 closed. However, the motor 49 may be stopped, by opening the compound switch 120. It is not important at what point the rotary control 108 stops because now the electric current is cut off from the machine, and the air supply is also cut off.

It is a simple matter to restart the machine. It is merely necessary to turn on the air supply to the line 37 and to close the compound switch 120. No matter in what position the pallet support member 28, the mold 22, and the pressure head 70 are in when the machine is restarted they will soon start functioning in their proper sequence. At no time can any of the parts jam with each other.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a brick or block machine, a supply hopper for the mixture to be formed into bricks or blocks, a vibrator table spaced beneath said hopper, a mold movably mounted for moving from beneath said hopper and from on said vibrator table to a second position adjacent said hopper and having a cut-off plate for closing the bottom of said hopper when in its second position, pallet support means for engaging a pallet against the bottom of said mold in its second position, and a pressure head for engaging into the top of said mold in its second position and provided with vibrator means.

2. In a brick or block machine, a supply hopper for the mixture to be formed into bricks or blocks, a vibrator table spaced beneath said hopper, a mold movably mounted for moving from beneath said hopper and from on said vibrator table to a second position adjacent said hopper and having a cut-off plate for closing the bottom of said hopper when in its second position, pallet support means for engaging a pallet against the bottom of said mold in its position, a pressure head for engaging into the top of said mold in its second position and provided with vibrator means, and means for operating said vibrator table for a short period of time when said mold is beneath said hopper.

3. In a brick or block machine, a supply hopper for the mixture to be formed into bricks or blocks, a vibrator table spaced beneath said hopper, a mold movably mounted for moving from beneath said hopper and from on said vibrator table to a second position adjacent said hopper and having a cut-off plate for closing the bottom of said hopper when in its second position, pallet support means for engaging a pallet against the bottom of said mold in its second position, a pressure head for engaging into the top of said mold in its second position and provided with vibrator means, and means for operating said vibrator means for a short period of time when said pressure head is resting on the material within said mold.

4. In a brick or block machine, a supply hopper for the mixture to be formed into bricks or blocks, a vibrator table spaced beneath said hopper, a mold movably mounted for moving from beneath said hopper and from on said vibrator table to a second position adjacent said hopper and having a cut-off plate for closing the bottom of said hopper when in its second position, pallet support means for engaging a pallet against the bottom of said mold in its second position, a pressure head for engaging into the top of said mold in its second position and provided with vibrator means, and means for raising and lowering said pallet support means so that said pallet may assume a position in which it may be removed and a new pallet may be supplied.

5. In a brick or block machine, a supply hopper for the mixture to be formed into bricks or blocks, a vibrator table spaced beneath said hopper, a mold movably mounted for moving from beneath said hopper and from on said vibrator table to a second position adjacent said hopper and having a cut-off plate for closing the bottom of said hopper when in its second position, pallet support means for engaging a pallet against the bottom of said mold in its second position, a pressure head for engaging into the top of said mold in its second position and provided with vibrator means, and means for raising and lowering said pallet support means so that said pallet may assume a position in which it may be removed and a new pallet may be supplied, and said pressure head being engageable through said mold when said pallet support means moves to its lowered position for stripping the brick or block from the mold.

6. A brick or block machine, comprising a frame, a supply hopper for the mixture to be made into bricks and blocks, a vibrator table spaced beneath said hopper, a mold movably mounted on said frame for moving from beneath said hopper and from on said vibrator table to a second position adjacent said hopper and having a cut-off plate for closing the bottom of said hopper when in its second position, a pallet support member vertically slidably mounted and when raised adapted to engage a pallet against the bottom of said mold in its second position and when lowered acting to support said pallet in a take-off position, cylinder and piston means for raising and lowering said pallet support member and including a control valve operated with a synchronous motor driven cam, cylinder and piston means for moving said mold to its second position and including a control valve operated by said pallet support member when in its raised position, a pressure head vertically slidably mounted and when lowered engaging into the top of said mold in its second position and provided with vibrator means and with stop rods for resting on said pallet, cylinder and piston means for lowering said pressure head and including a control valve operated by said mold when in its second position, trip means operated when said pallet support member moves to its lowered position for tripping said last named control valve for causing said pressure head to be raised, a second valve for controlling the cylinder and piston means for moving said mold and operated by said pressure head when in its raised position for causing said mold to be moved back to its first position, and trip means for tripping said second valve when said mold reaches its first position.

7. A brick or block machine, comprising a frame, a supply hopper for the mixture to be made into bricks and blocks, a vibrator table spaced beneath said hopper, a mold movably mounted on said frame for moving from beneath said hopper and from one said vibrator table to a second position adjacent said hopper and having a cut-off plate for closing the bottom of said hopper when in its second position, a pallet support member vertically slidably mounted and when raised adapted to engage a pallet against the bottom of said mold in its second position and when lowered acting to support said pallet in a take-off position, cylinder and piston means for raising and lowering said pallet support members and including a control valve operated with a synchronous motor driven cam, cylinder and piston means for moving said mold to its second position and including a control valve operated by said pallet support member when in its raised position, a pressure head vertically slidably mounted and when lowered engaging into the top of said mold in its second position and provided with vibrator means and with stop rods for resting on said pallet, cylinder and piston means for lowering said pressure head and including a control valve operated by said mold when in its second position, trip means operated when said pallet support member moves to its lowered position for tripping said last named control valve for causing said pressure head to be raised, a second valve for controlling the cylinder and piston means for moving said mold and operated by said pressure head when in its raised position for causing said mold to be moved back to its first position, trip means for tripping said second valve when said mold reaches its first position, a limit switch engaged by said mold in its first position for starting the synchronous motor of said driven cam, and a switch controlled by said cam for operating mechanism for opening said limit switch.

8. A brick or block machine, comprising a frame, a supply hopper for the mixture to be made into bricks and blocks, a vibrator table spaced beneath said hopper, a mold movably mounted on said frame for moving from beneath said hopper and from one said vibrator table to a second position adjacent said hopper and having a cut-off plate for closing the bottom of said hopper when in its second position, a pallet support member vertically slidably mounted and when raised adapted to engage a pallet against the bottom of said mold in its second position and when lowered acting to support said pallet in a take-off position, cylinder and piston means for raising and lowering said pallet support member and including a control valve operated with a synchronous motor driven cam, cylinder and piston means for moving said mold to its second position and including a control valve operated by said pallet support member when in its raised position, a pressure head vertically slidably mounted and when lowered engaging into the top of said mold in its second position and provided with vibrator means and with stop rods for resting on said pallet, cylinder and piston means for lowering said pressure head and including a control valve operated when said pallet support member moves to its lowered position for tripping said last named control valve for causing said pressure head to be raised, a second valve for controlling the cylinder and piston means for moving said mold and operated by said pressure head when in its raised position for causing said mold to be moved back to its first position, trip means for tripping said second valve when said mold reaches its first position, a limit switch engaged by said mold in its first position for starting the synchronous motor of said driven cam, a switch controlled by said cam for operating mechanism for opening said limit switch, another switch controlled by said cam for operating the vibrator of said vibrator table.

9. A brick or block machine, comprising a frame, a supply hopper for the mixture to be made into bricks and blocks, a vibrator table spaced beneath said hopper, a mold movably mounted on said frame for moving from beneath said hopper and from one said vibrator table to a second position adjacent said hopper and having a cut-off plate for closing the bottom of said hopper when in its second position, a pallet support member vertically slidably mounted and when raised adapted to engage a pallet against the bottom of said mold in its second position and when lowered acting to support said pallet in a take-off position, cylinder and piston means for raising and lowering said pallet support member and including a control valve operated with a synchronous motor driven cam, cylinder and piston means for moving said mold to its second position and including a control valve operated by said pallet support member when in its raised position, a pressure head vertically slidably mounted and when lowered engaging into the top of said mold in its second position and provided with vibrator means and with stop rods for resting on said pallet, cylinder and piston means for lowering said pressure head and including a control valve operated when said pallet support member moves to its lowered position for tripping said last named control valve for causing said pressure head to be raised, a second valve for controlling the cylinder and piston means for moving said mold and operated by said pressure head when in its raised position for causing said mold to be moved back to its first position, trip means for tripping said second valve when said mold reaches its first position, a limit switch engaged by said mold in its first position for starting the synchronous motor of said driven cam, a switch controlled by said cam for operating mechanism for opening said limit switch, another switch controlled by said cam for operating the vibrator of said vibrator table, a limit switch engaged by said pressure head in a partially lowered position thereof for operating the vibrator of the pressure head.

10. A brick or block machine, comprising a frame, a supply hopper for the mixture to be made into bricks and blocks, a vibrator table spaced beneath said hopper, a mold movably mounted on said frame for moving from beneath said hopper and from on said vibrator table to a second position adjacent said hopper and having a cut-off plate for closing the bottom of said hopper when in its second position, a pallet support member vertically slidably mounted and when raised adapted to engage a pallet against the bottom of said mold in its second position and when lowered acting to support said pallet in a take-off position, cylinder and piston means for raising and lowering said pallet support and including a control valve operated with a synchronous motor driven cam, cylinder and piston means for moving said mold to its second position and including a control valve operated by said pallet support member when in its raised position, a pressure head vertically slidably mounted and when lowered engaging into the top of said mold in its second position and provided with vibrator means and with stop rods for resting on said pallet, cylinder and piston means for lowering said pressure head and including a control valve operated by said mold when in its second position, trip means operated when said pallet support member moves to its lowered position for tripping said last named control valve for causing said pressure head to be raised, a second valve for controlling the cylinder and piston means for moving said mold and operated by said pressure head when in its raised position for causing said mold to be moved back to its first position, and trip means for tripping said second valve when said mold reaches its first position, said control valves having inlets and outlets and reliefs and in one position thereof connecting said inlets with said outlets and in another position thereof connecting said outlets with said reliefs.

11. A brick or block machine, comprising a frame, a supply hopper for the mixture to be made into bricks and blocks, a vibrator table spaced beneath said hopper, a mold movably mounted on said frame for moving from beneath said hopper and from on said vibrator table to a second position adjacent said hopper and having a cut-off plate for closing the bottom of said hopper when in its second position, a pallet support member vertically slidably mounted and when raised adapted to engage a pallet against the bottom of said mold in its second position and when lowered acting to support said pallet in a take-off position, cylinder and piston means for raising and lowering said pallet support member and including a control valve operated with a synchronous motor driven cam, cylinder and piston means for moving said mold to its second position and including a control valve operated by said pallet support member when in its raised position, a pressure head vertically slidably mounted and when lowered engaging into the top of said mold in its second position and provided with vibrator means and with stop rods for resting on said pallet, cylinder and piston means for lowering said pressure head and including a control valve operated by said mold when in its second position, trip means operated when said pallet support member moves to its lowered position for tripping said last named control valve for causing said pressure head to be raised, a second valve for controlling the cylinder and piston means for moving said mold and operated by said pressure head when in its raised position for causing said mold to be moved back to its first position, and trip means for tripping said second valve when said mold reaches its first position, said first named trip means including a pivoted bolt which normally engages against the control of said control valve, resilient means holding said pivoted bolt in said position, and a finger on said pressure head engageable against said pivoted bolt to move it free from the control of the valve.

12. A brick or block machine, comprising a frame, a supply hopper for the mixture to be made into bricks and blocks, a vibrator table spaced beneath said hopper, a mold movably mounted on said frame for moving from beneath said hopper and from on said vibrator table to a second position adjacent said hopper and having a cut-off plate for closing the bottom of said hopper when in its second position, a pallet support member vertically slidably mounted and when raised adapted to engage a pallet against the bottom of said mold in its second position and when lowered acting to support said pallet in a take-off position, cylinder and piston means for raising and lowering said pallet support member and including a control valve operated with a synchronous motor driven cam, cylinder and piston means for moving said mold to its second position and including a control valve operated by said pallet support member when in its raised position, a pressure head vertically slidably mounted and when lowered engaging into the top of said mold in its second position and provided with vibrator means and with stop rods for resting on said pallet, cylinder and piston means for lowering said pressure head and including a control valve operated by said mold when in its second position, trip means operated when said pallet support member moves to its lowered position for tripping said last named control valve for causing said pressure head to be raised, a second valve for controlling the cylinder and piston means for moving said mold and operated by said pressure head when in its raised position for causing said mold to be moved back to its first position, and trip means for tripping said second valve when said mold reaches its first position, including a bolt connected with said pressure head and engageable with the control of said control valve, and a trip lever for moving said bolt inwards and itself being moved indirectly by said mold when the mold reaches its first position.

LOUIS GELBMAN.

REFERENCES CITED

The following references are of record in the file of this patent:

UNITED STATES PATENTS

| Number | Name | Date |
| --- | --- | --- |
| 2,009,487 | Ernst et al. | July 30, 1935 |
| 2,373,201 | Smith | Apr. 10, 1945 |
| 291,505 | Gaunt et al. | Jan. 8, 1884 |
| 2,067,401 | Lassman | Jan. 12, 1937 |